United States Patent
Chai et al.

(10) Patent No.: US 11,424,964 B2
(45) Date of Patent: Aug. 23, 2022

(54) SOUNDING REFERENCE SIGNAL RECEIVING METHOD, APPARATUS, AND SYSTEM

(71) Applicant: HUAWEI TECHNOLOGIES CO., LTD., Guangdong (CN)

(72) Inventors: Xiaomeng Chai, Shanghai (CN); Yiqun Wu, Shanghai (CN); Yan Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/804,624

(22) Filed: Feb. 28, 2020

(65) Prior Publication Data
US 2020/0204408 A1 Jun. 25, 2020

Related U.S. Application Data

(63) Continuation of application No. PCT/CN2018/103031, filed on Aug. 29, 2018.

(30) Foreign Application Priority Data

Aug. 31, 2017 (CN) .......................... 201710774658.1

(51) Int. Cl.
*H04W 72/04* (2009.01)
*H04L 5/00* (2006.01)
(Continued)

(52) U.S. Cl.
CPC ........ *H04L 25/0226* (2013.01); *H04L 5/0051* (2013.01); *H04W 28/0278* (2013.01); *H04W 72/042* (2013.01); *H04W 72/14* (2013.01)

(58) Field of Classification Search
None
See application file for complete search history.

(56) References Cited

U.S. PATENT DOCUMENTS 8,848,642 B2 9/2014 Noh et al.
2013/0294381 A1* 11/2013 Wang .................... H04L 5/0051
370/329

(Continued)

FOREIGN PATENT DOCUMENTS

AU 2014265044 B2 5/2016
CN 102340800 A 2/2012
(Continued)

OTHER PUBLICATIONS

Research in Motion et al: "Performance Enhancement of AperiodicSRS with Configurable Duration",3GPP Draft; R1-104061,Jun. 22, 2010 (Jun. 22, 2010), XP050598494,total 4 pages.

(Continued)

*Primary Examiner* — Sai Aung
(74) *Attorney, Agent, or Firm* — Womble Bond Dickinson (US) LLP

(57) ABSTRACT

A sounding reference signal sending method, a sounding reference signal receiving method, an apparatus, and a system relating to the field of communications technologies to improve SRS resource utilization and reduce resource waste are disclosed. The method includes: receiving, by a terminal device, SRS configuration information sent by a network side device, where the SRS configuration information includes first-type indication information used to instruct the terminal device to trigger, based on uplink data, sending of an SRS; and once there is the uplink data needing to be transmitted, sending the SRS on an SRS resource.

20 Claims, 15 Drawing Sheets

(51) Int. Cl.
*H04W 56/00* (2009.01)
*H04L 25/02* (2006.01)
*H04W 28/02* (2009.01)
*H04W 72/14* (2009.01)

(56) References Cited

U.S. PATENT DOCUMENTS

| | | | |
|---|---|---|---|
| 2014/0036880 A1* | 2/2014 | Dalsgaard | H04W 52/0219 |
| | | | 370/336 |
| 2014/0233528 A1 | 8/2014 | Webb et al. | |
| 2016/0353453 A1 | 12/2016 | Au et al. | |
| 2018/0270033 A1 | 9/2018 | Dou et al. | |
| 2019/0141682 A1* | 5/2019 | Tang | H04W 72/042 |
| 2019/0215110 A1* | 7/2019 | Yang | H04W 76/27 |
| 2021/0126749 A1* | 4/2021 | Iyer | H04B 7/0482 |

FOREIGN PATENT DOCUMENTS

| | | |
|---|---|---|
| CN | 102714869 A | 10/2012 |
| CN | 106455092 A | 2/2017 |
| CN | 106712919 A | 5/2017 |

OTHER PUBLICATIONS

LG Electronics: "Frequency granularity of NR CSI components",3GPP Draft; R1-1611825,Nov. 13, 2016 (Nov. 13, 2016), XP051175794,total 4 pages.

3GPP TSG-RAN WG1 Meeting #63bis,R1-110210,Remaining issues on aperiodic SRS triggering,Panasonic,Dublin, Ireland, Jan. 17-21, 2010,total 4 pages.

* cited by examiner

SOUNDING REFERENCE SIGNAL RECEIVING METHOD, APPARATUS, AND SYSTEM

CROSS-REFERENCE TO RELATED APPLICATIONS

This application is a continuation of International application PCT/CN2018/103031, filed on Aug. 29, 2018, which claims priority to Chinese Patent Application No. 201710774658.1, filed on Aug. 31, 2017. The disclosures of the aforementioned applications are hereby incorporated by reference in their entireties.

TECHNICAL FIELD

The present disclosure relates to the field of communications technologies, and in particular, to a sounding reference signal (SRS) sending method, a sounding reference signal receiving method, an apparatus, and a system.

BACKGROUND

In a communications system, one of main methods for obtaining uplink channel quality is that a network side device measures an SRS sent by a terminal device, to perform channel estimation to obtain the uplink channel quality. Currently, two SRS sending solutions are defined in an LTE system: a periodic SRS sending solution and an aperiodic SRS sending solution.

The periodic SRS sending solution is as follows: The network side device configures, for the terminal device by using higher layer signaling, a periodic SRS resource used to send an SRS. After receiving the higher layer signaling, the terminal device starts to periodically send the SRS on the SRS resource. To be specific, starting from receiving the higher layer signaling, the terminal device sends the SRS once every preset time period until the SRS resource is released. The network side device may continuously obtain the uplink channel quality by using the periodic SRS, to ensure that the network side device can obtain a relatively high throughput gain when the terminal device sends a relatively large data packet or when the terminal device needs to continuously send data.

However, for a burst service or a sporadic small packet service, the terminal device does not have data needing to be transmitted for most of the time. If the foregoing periodic SRS sending solution is still used, the terminal device still sends the SRS when the terminal device does not transmit data. These SRSs are useless, and consequently, a resource waste is caused.

SUMMARY

The present disclosure provides an SRS sending method, an SRS receiving method, an apparatus, and a system, to improve SRS resource utilization and reduce resource waste.

According to a first aspect, the present disclosure provides an SRS sending method, applied to a terminal device. The method includes: receiving SRS configuration information sent by a network side device, where the SRS configuration information includes first-type indication information used to instruct the terminal device to trigger, based on uplink data, sending of an SRS; and once there is the uplink data needing to be transmitted, sending a SRS on an SRS resource.

By using the SRS sending method provided in the present disclosure, the terminal device is enabled to send the SRS only when the terminal device has the uplink data needing to be transmitted. This avoids sending the SRS when the terminal device has no data to be transmitted, thereby improving SRS resource utilization, and reducing resource waste.

In one embodiment, the sending the SRS on an SRS resource includes: sending the SRS on each SRS resource that is between a first moment and a second moment, where the first moment is a moment at which the uplink data is detected or a buffer status report BSR is detected, and the second moment is a moment at which downlink control information that is sent by the network side and that corresponds to the uplink data is received.

In one embodiment, when the terminal device has the uplink data needing to be transmitted, the terminal device may send the SRS on each SRS resource that is between the first moment and the second moment, so that the network side device can continuously obtain uplink channel quality before delivering the downlink control information for the uplink data, to ensure reliability of scheduling information allocated to the uplink data.

In one embodiment, the sending the SRS on an SRS resource includes: sending the SRS on K SRS resources that are after a first moment, where the first moment is a moment at which the uplink data is detected or a BSR is detected, $K \geq 1$, and K is an integer.

In one embodiment, if the terminal device is in a conventional GB data transmission scenario, when the terminal device has the uplink data needing to be transmitted, the terminal device may send the SRS on the first K SRS resources that are after the first moment. The sent SRS may be used by the network side device to estimate uplink channel quality, or may be used to request, in place of a scheduling request (SR), resource scheduling from the network side device.

In one embodiment, the method further includes: transmitting the uplink data on a grant-free (GF) resource, where a period of the GF resource is greater than or equal to a SRS resource period, and J SRS resources exist in the period of the GF resource; and the sending the SRS on K SRS resources that are after a first moment includes: sending the SRS on the K SRS resources that are during a period when the uplink data is transmitted, where K={M, N, J}.

In one embodiment, the terminal device may send an SRS on each SRS resource during the period when the uplink data is transmitted, thereby enhancing robustness of a system, and improving accuracy of performing uplink channel quality estimation by the network side device. Alternatively, the SRS may be sent on M or N SRS resources that are during the period when the uplink data is transmitted, thereby further improving SRS resource utilization, and reducing resource waste.

In one embodiment, when K={M, N}, the sending the SRS on the K SRS resources that are during a period when the uplink data is transmitted includes: sending the SRS on the last K SRS resources that are during the period when the uplink data is transmitted.

In one embodiment, the SRS is sent on the last K SRS resources that are during the period when the uplink data is transmitted, so that the terminal device can improve SRS resource utilization and reduce resource waste while ensuring accuracy of uplink channel quality estimation.

In one embodiment, the method further includes: transmitting the uplink data on a GF resource, where a period of the GF resource is less than a SRS resource period, and the sending the SRS on K SRS resources that are after a first moment includes: correspondingly sending the SRS on the first K SRS resources that are after the first moment, where K=N.

In one embodiment, the method further includes: receiving control information sent by the network side device, where the control information is used to instruct to determine, in each SRS resource period based on whether there is uplink data, whether to skip the SRS resource period; and once there is the uplink data needing to be transmitted, the sending the SRS on an SRS resource includes: if there is the uplink data, sending the SRS on the SRS resource that is in the SRS resource period; and if there is no uplink data, skipping the SRS resource period.

In one embodiment, the terminal device may determine, in each SRS resource period based on whether there is the uplink data needing to be transmitted, to send the SRS or skip the SRS resource period. This avoids sending a useless SRS when there is no uplink data, thereby improving SRS resource utilization, and reducing resource waste.

According to a second aspect, the present disclosure provides an SRS receiving method, applied to a network side device. The method includes: sending SRS configuration information to a terminal device, where the SRS configuration information includes first-type indication information used to instruct the terminal device to trigger, based on uplink data, sending of an SRS; and receiving the SRS that is sent by the terminal device based on the SRS configuration information.

By using the SRS sending method provided in the present disclosure, the network side device instructs, by using the first-type indication information in the SRS configuration information, the terminal device to send the SRS when there is the uplink data needing to be transmitted. This avoids sending the SRS when the terminal device has no data to be transmitted, thereby improving SRS resource utilization, and reducing resource waste.

According to a third aspect, the present disclosure provides an SRS sending method, applied to a terminal device. The method includes: receiving SRS configuration information and control information that are sent by a network side device, where the SRS configuration information includes second-type indication information used to instruct the terminal device to trigger, based on higher layer signaling, sending of an SRS, and the control information is used to instruct the terminal device to determine, in each SRS resource period based on whether there is uplink data, whether to skip the SRS resource period; if there is the uplink data, sending the SRS on the SRS resource that is in the SRS resource period; and if there is no uplink data, skipping the SRS resource period.

By using the SRS sending method provided in the present disclosure, the terminal device sends the SRS only in a SRS resource period that has uplink data needing to be transmitted, and does not send the SRS in a SRS resource period that has no uplink data needing to be transmitted. This avoids sending the SRS when the terminal device has no data to be transmitted, thereby improving SRS resource utilization, and reducing resource waste.

According to a fourth aspect, the present disclosure further provides an SRS receiving method, applied to a network side device. The method includes: sending SRS configuration information and control information to a terminal device, where the SRS configuration information includes second-type indication information used to instruct the terminal device to trigger, based on higher layer signaling, sending of an SRS, and the control information is used to instruct the terminal device to determine, in each SRS resource period based on whether there is uplink data, whether to skip the SRS resource period; and receiving the SRS that is sent by the terminal device based on the SRS configuration information and the control information.

By using the SRS sending method provided in the present disclosure, the network side device instructs, by using the SRS configuration information and the control information, the terminal device to send the SRS only in a SRS resource period that has the uplink data needing to be transmitted, and send no SRS in a SRS resource period that has no uplink data needing to be transmitted. This avoids sending the SRS when the terminal device has no data to be transmitted, thereby improving SRS resource utilization, and reducing resource waste.

According to a fifth aspect, the present disclosure provides a terminal device, including: a receiving unit, configured to receive sounding reference signal (SRS) configuration information sent by a network side device, where the SRS configuration information includes first-type indication information used to instruct a sending unit to trigger, based on uplink data, sending of an SRS; a buffer unit, configured to buffer the uplink data; and the sending unit, configured to: once there is the uplink data needing to be transmitted in the buffer unit, send the SRS on a SRS resource.

In one embodiment, the sending, by the sending unit, the SRS on the SRS resource specifically includes: sending the SRS on each SRS resource that is between a first moment and a second moment, where the first moment is a moment at which the uplink data is detected or a BSR is detected, and the second moment is a moment at which downlink control information that is sent by the network side device and that corresponds to the uplink data is received.

In one embodiment, the sending, by the sending unit, the SRS on the SRS resource specifically includes: sending the SRS on K SRS resources that are after a first moment, where the first moment is a moment at which the uplink data is detected or a BSR is detected, K≥1, and K is an integer.

In one embodiment, the sending unit is further configured to transmit the uplink data on a grant-free (GF) resource, where a period of the GF resource is greater than or equal to a SRS resource period, and J SRS resources exist in the period of the GF resource; and the sending, by the sending unit, the SRS on K SRS resources that are after a first moment specifically includes: sending the SRS on the K SRS resources that are during a period when the uplink data is transmitted, where K={M, N, J}.

In one embodiment, when K={M, N}, the sending, by the sending unit, the SRS on the K SRS resources that are during a period when the uplink data is transmitted specifically includes: sending the SRS on the last K SRS resources that are during the period when the uplink data is transmitted.

In one embodiment, the sending unit is further configured to transmit the uplink data on a GF resource, where a period of the GF resource is less than a SRS resource period; and the sending, by the sending unit, the SRS on K SRS resources that are after a first moment specifically includes: sending the SRS on the first K SRS resources that are after the first moment, where K=N.

In one embodiment, the receiving unit is further configured to: receive control information sent by the network side device, where the control information is used to instruct to determine, in each SRS resource period based on whether there is the uplink data, whether to skip the SRS resource period; and once the buffer unit buffers the uplink data needing to be transmitted, the sending, by the sending unit, the SRS on the SRS resource specifically includes: if the buffer unit buffers the uplink data, the sending unit sends the SRS on the SRS resource that is in the SRS resource period; and if the buffer unit has no uplink data, the sending unit skips the SRS resource period.

For technical effects of the terminal device provided in the present disclosure, refer to technical effects of the first aspect or the implementations of the first aspect. Details are not described herein again.

According to a sixth aspect, the present disclosure provides a network side device, including: a sending unit, configured to send SRS configuration information to a terminal device, where the SRS configuration information includes first-type indication information used to instruct the terminal device to trigger, based on uplink data, sending of an SRS; and a receiving unit, configured to receive the SRS that is sent by the terminal device based on the SRS configuration information.

For technical effects of the network side device provided in the present disclosure, refer to technical effects of the second aspect or the implementations of the second aspect. Details are not described herein again.

According to a seventh aspect, the present disclosure provides a terminal device, including: a receiving unit, configured to receive SRS configuration information and control information that are sent by a network side device, where the SRS configuration information includes second-type indication information used to instruct a sending unit to trigger, based on higher layer signaling, sending of an SRS, and the control information is used to instruct the terminal device to determine, in each SRS resource period based on whether there is uplink data, whether to skip the SRS resource period; and the sending unit, configured to: if there is the uplink data, send the SRS on the SRS resource that is in the SRS resource period; and if there is no uplink data, skip the SRS resource period.

For technical effects of the terminal device provided in the present disclosure, refer to technical effects of the third aspect or the implementations of the third aspect. Details are not described herein again.

According to an eighth aspect, the present disclosure provides a network side device, including: a sending unit, configured to send SRS configuration information and control information to a terminal device, where the SRS configuration information includes second-type indication information used to instruct the terminal device to trigger, based on higher layer signaling, sending of an SRS, and the control information is used to instruct the terminal device to determine, in each SRS resource period based on whether there is uplink data, whether to skip the SRS resource period; and a receiving unit, configured to receive the SRS that is sent by the terminal device based on the SRS configuration information and the control information.

For technical effects of the network side device provided in the present disclosure, refer to technical effects of the fourth aspect or the implementations of the fourth aspect. Details are not described herein again.

With reference to the first aspect to the eighth aspect, in one embodiment, a sum of bandwidths of M SRS resources is equal to a bandwidth of a grant-based (GB) resource, or a sum of bandwidths of N SRS resources is equal to a total bandwidth available for the SRS resource, where $M \geq 1$, M is an integer, $N \geq 1$, and N is an integer.

In one embodiment, the SRS configuration information further includes configuration information of the SRS resource.

According to a ninth aspect, the present disclosure further provides a terminal device, including: a processor, a memory, and a transceiver. The memory is configured to store a computer-executable instruction; the transceiver is configured to receive SRS configuration information, and send an SRS and uplink data; and the processor is connected to the memory and the transceiver by using a bus. When the terminal device runs, the processor executes the computer-executable instruction stored in the memory, to implement the SRS sending method according to the first aspect and the implementations of the first aspect.

For technical effects of the terminal device provided in the present disclosure, refer to technical effects of the first aspect or the implementations of the first aspect. Details are not described herein again.

According to a tenth aspect, the present disclosure further provides a network side device, including: a processor, a memory, and a transceiver. The memory is configured to store a computer-executable instruction; the transceiver is configured to send SRS configuration information, and receive an SRS and uplink data; and the processor is connected to the memory and the transceiver by using the bus. When the network side device is run, the processor executes the computer-executable instruction stored in the memory, to implement the receiving method for an SRS according to the second aspect.

For technical effects of the network side device provided in the present disclosure, refer to technical effects of the second aspect or the implementations of the second aspect. Details are not described herein again.

According to an eleventh aspect, the present disclosure provides a terminal device, including: a processor, a memory, and a transceiver. The memory is configured to store a computer-executable instruction; the transceiver is configured to receive SRS configuration information and control information, and send an SRS and uplink data; and the processor is connected to the memory and the transceiver by using the bus. When the terminal device runs, the processor executes the computer-executable instruction stored in the memory, to implement the SRS sending method according to the third aspect and the implementations of the third aspect.

According to a twelfth aspect, the present disclosure further provides a network side device, including: a processor, a memory, and a transceiver. The memory is configured to store a computer-executable instruction; the transceiver is configured to send SRS configuration information and control information, and receive an SRS and uplink data; and the processor is connected to the memory and the transceiver by using the bus. When the network side device runs, the processor executes the computer-executable instruction stored in the memory, to implement the SRS receiving method according to the fourth aspect or the implementations of the fourth aspect.

For technical effects of the network side device provided in the present disclosure, refer to technical effects of the fourth aspect or the implementations of the fourth aspect. Details are not described herein again.

According to a thirteenth aspect, the present disclosure further provides a computer storage medium. The computer storage medium stores an instruction, and when the instruction is run on a computer, the computer is enabled to perform the method according to the first aspect, the second aspect, the third aspect, or the fourth aspect.

According to a fourteenth aspect, the present disclosure further provides a computer program product including an instruction. When the computer program product is run on a computer, the computer is enabled to perform the method according to the first aspect, the second aspect, the third aspect, or the fourth aspect.

According to a fifteenth aspect, the present disclosure provides a communications system, including the terminal device according to the fifth aspect or any embodiment of the fifth aspect and the network side device according to the sixth aspect or the tenth aspect; or including the terminal device according to the seventh aspect and the network side device according to the eighth aspect or the twelfth aspect; or including the terminal device according to the ninth aspect and the network side device according to the sixth aspect or the tenth aspect; or including the terminal device according to the eleventh aspect and the network side device according to the eighth aspect or the twelfth aspect.

DESCRIPTION OF EMBODIMENTS

An SRS sending method provided in the present disclosure may be applicable to a long term evolution (LTE) system, a long term evolution-advanced (LTE advanced, LTE-A) system, a subsequent evolved system using the LTE system such as a 5th generation communications (5G) system, and other wireless communications systems that use various wireless access technologies.

Figure 1:
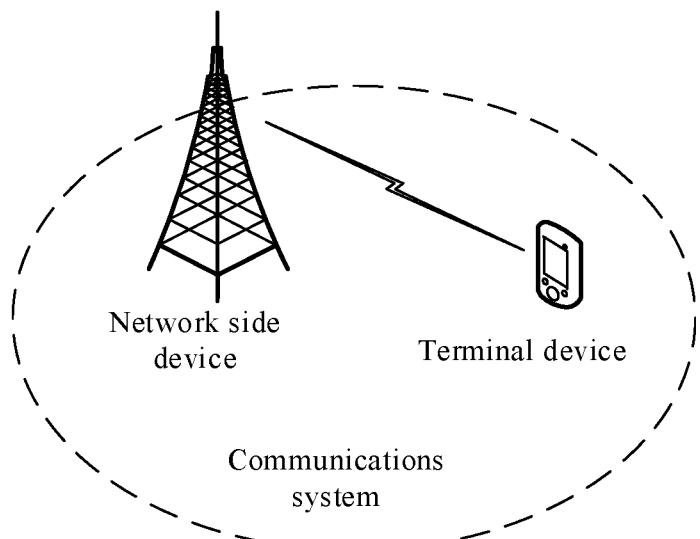
FIG. 1 is a schematic diagram of a communications system according to the present disclosure.

For example, as shown in FIG. 1, an SRS sending method provided in the present disclosure may be applied to a communications system including at least one network side device and at least one terminal device. The network side device may be a base station (BS) or a base transceiver station (BTS), and is an apparatus that is deployed in a radio access network and that is configured to provide a wireless communication function for the terminal device. In systems using different radio access technologies, a device having a base station function may have different names. For example, in an LTE system, the device is referred to as an evolved NodeB (eNB or eNodeB), and in a 3rd generation communications (3G) network, the device is referred to as a Node B, or is applied to a 5th generation communications system, or the like. For ease of description, in the present disclosure, the devices that have a base station function and that are mentioned above are collectively referred to as a network side device.

The terminal device in the present disclosure may include various devices that have a wireless communication function, for example, a handheld device, an in-vehicle device, a wearable device, a computing device, a smartphone, a smartwatch, a tablet or another processing device connected to a wireless modem, and user equipment (UE), a mobile station (MS), a terminal, and the like that are in various forms. For ease of description, in the present disclosure, the devices mentioned above are collectively referred to as a terminal device.

Figure 2:
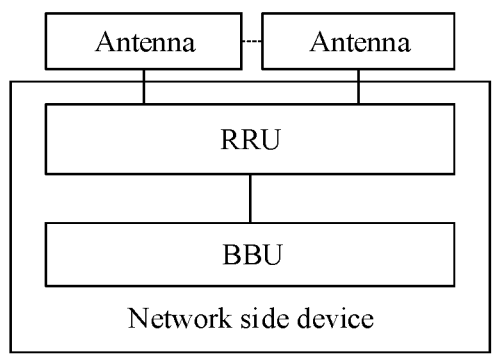
FIG. 2 is a first schematic structural diagram of a network side device according to the present disclosure.

FIG. 2 is a network side device according to the present disclosure. The network side device includes a remote radio unit (RRU), a baseband processing unit (baseband unit, BBU), and an antenna feeder system.

The RRU includes a digital intermediate frequency module, a transceiver module, and a power amplification module and a filtering module. The digital intermediate frequency module is configured for modulation and demodulation of an electromagnetic wave transmission signal, digital up/down conversion, A/D conversion, and the like; the transceiver module completes conversion from an intermediate frequency signal to a radio frequency signal; and then the radio frequency signal is transmitted by using an antenna port after passing through the power amplification module and the filtering module. The BBU is configured to: perform functions such as channel coding and decoding, modulation and demodulation of a baseband signal, and protocol processing, provide an interface function to an upper-layer network element, and complete a processing process of a physical layer core technology, for example, code division multiple access (CDMA) in the 3G and orthogonal frequency division multiplexing (OFDM)/multiple-input multiple-output (MIMO) processing in the LTE. The antenna feeder system mainly includes an antenna, and may further include a coupler, a diplexer, and the like, and is configured for data transmission between another network element (for example, UE or a network side device in another cell) and the RRU.

Figure 3:
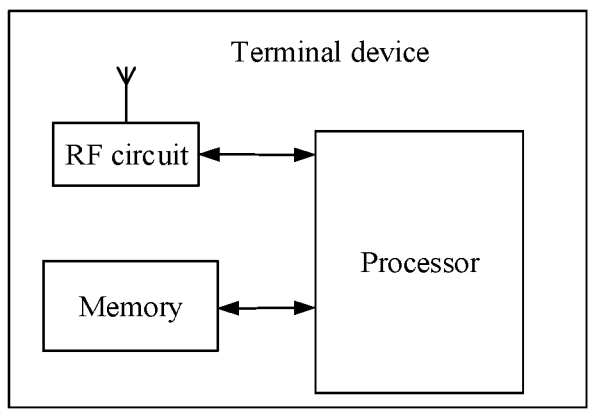
FIG. 3 is a first schematic structural diagram of a terminal device according to the present disclosure.

FIG. 3 is a terminal device according to the present disclosure, including a processor, a memory, an RF circuit, and the like.

The processor is a control center of the terminal device, is connected to each part of the entire terminal device by using various interfaces and lines, and performs various functions of the terminal device and data processing by running or executing a software program and/or a module that are/is stored in the memory and by invoking data stored in the memory, to perform overall monitoring on the terminal device. The processor may include a digital signal processor device, a microprocessor device, an analog-to-digital converter, a digital-to-analog converter, and the like, and control and signal processing functions of the terminal device can be allocated to these devices based on capabilities of these devices. The RF circuit may be configured to send and receive information, and send received information to the processor for processing. Usually, the RF circuit includes but is not limited to an antenna, at least one amplifier, a transceiver, a coupler, a low noise amplifier (LNA), a duplexer, and the like, and communicates with a network and another device by using wireless communication. Any communications standard or protocol may be used by the wireless communication, including but not limited to a global system for mobile communications (GSM), a general packet radio service (GPRS), CDMA, wideband code division multiple access (WCDMA), LTE, Wi-Fi, or low power consumption Wi-Fi, a WLAN technology, and the like.

Figure 4:
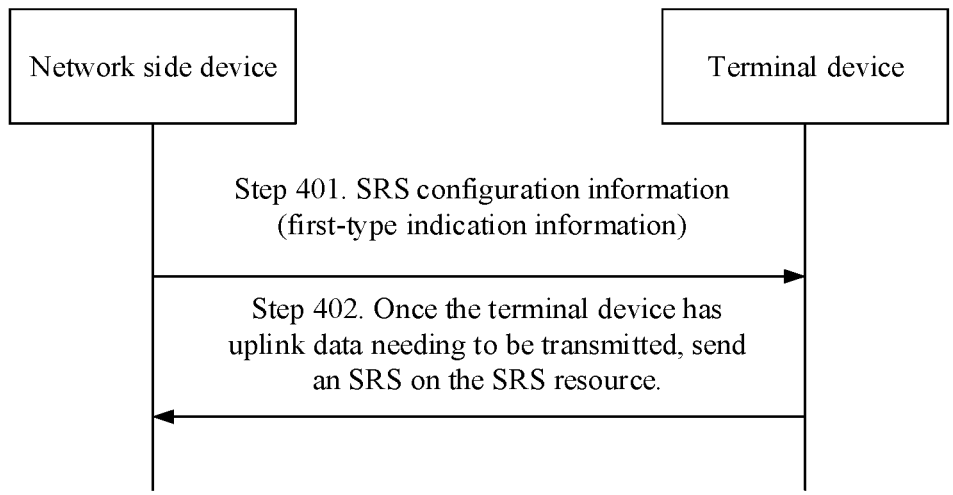
FIG. 4 is a flowchart of an embodiment of an SRS sending method according to the present disclosure.

FIG. 4 is a flowchart of an embodiment of an SRS sending method according to the present disclosure, and the method includes the following operations.

Operation 401. A network side device sends SRS configuration information, where the SRS configuration information includes first-type indication information used to instruct a terminal device to trigger, based on uplink data, sending of an SRS.

In an embodiment, the SRS configuration information may include only the first-type indication information. In this case, the SRS configuration information is the first-type indication information. In this embodiment, after receiving the SRS configuration information, the terminal device may trigger, based on the uplink data, sending of the SRS on a previously configured SRS resource or a predetermined SRS resource. The previously configured SRS resource is an SRS resource that has been configured, before the network side device sends the SRS configuration information, for the terminal device by using other configuration information. The predetermined SRS resource is an SRS resource specified by a standard protocol. In another embodiment, the previously configured SRS resource may alternatively be replaced with a subsequently configured SRS resource. To be specific, the SRS resource is configured, after the network side device sends the SRS configuration information, by the network side device by using other configuration information.

In another embodiment, in addition to the first-type indication information, the SRS configuration information may further include configuration information of the SRS resource. The configuration information of the SRS resource indicates a specific position of the SRS resource. In the present disclosure, the SRS resource is a resource used to send the SRS, and the resource includes at least one of a frequency-domain resource and a time-domain resource. When the SRS configuration information includes the first-type indication information and the configuration information of the SRS resource, the terminal device triggers, based on the uplink data, sending of the SRS on the SRS resource that is indicated by the configuration information of the SRS resource.

For example, the network side device may set a trigger type indicator bit in the SRS configuration information, and instruct, by using different assignments, the terminal device to send the SRS in different trigger manners. For example, trigger type=2 may be set to indicate the first-type indication information, that is, to instruct the terminal device to trigger, based on the uplink data, sending of the SRS. After receiving the SRS configuration information, the terminal device triggers sending of the SRS only when there is the uplink data needing to be sent. If there is no uplink data needing to be sent, the terminal device does not trigger sending of the SRS. In an embodiment, after receiving the SRS configuration information, the terminal device triggers sending of the SRS only when there is new uplink data needing to be sent. In the present disclosure, the new uplink data is uplink data that has not been sent, and may be understood as uplink data that needs to be initially transmitted.

In the present disclosure, the network side device may add the SRS configuration information to higher layer signaling, and send the higher layer signaling to the terminal device. For example, the higher layer signaling may be a broadcast message, a common radio resource control (RRC) message, or a user dedicated RRC message. When the SRS configuration information includes the configuration information of the SRS resource, an SRS resource configured by using the SRS configuration information that is carried in the higher layer signaling may be in an available state by default (that is, a state in which the SRS can be sent). In another embodiment, the SRS resource configured by using the SRS configuration information that is carried in the higher layer signaling is not in an available state, and needs to be activated by using an underlying control signal such as downlink control information (DCI). In another embodiment, the network side device may further deactivate, by using the underlying control signal, an SRS resource that is of the terminal device and that has been in an available state. The activating the SRS resource means that the SRS resource is enabled to be in an available state, and the deactivating the SRS resource means that the SRS resource is enabled to be in an unavailable state.

Operation 402. Once the terminal device has the uplink data needing to be transmitted, the terminal device sends the SRS on the SRS resource.

In the present disclosure, after receiving the SRS configuration information, the terminal device determines, based on the first type indication information, that the terminal device determines, based on whether there is the uplink data needing to be transmitted in an uplink buffer corresponding to a media access control (MAC) entity of the terminal device, whether to trigger sending of the SRS. For example, when the uplink buffer has the uplink data, the terminal device may directly trigger sending of the SRS. Alternatively, when the uplink buffer has the uplink data needing to be sent, the MAC entity of the terminal device may trigger sending of a BSR, and when at least one BSR is triggered and is not canceled, sending of the SRS may be triggered, so that the terminal device starts to prepare to send the SRS on the SRS resource indicated by the SRS configuration information.

It should be noted that a bandwidth of the SRS resource sent by the terminal device may be configured by the network side device. In the present disclosure, a sum of bandwidths of M SRS resources is equal to a bandwidth of a grant-based (GB) resource; or a sum of bandwidths of N SRS resources is equal to a total bandwidth available for the SRS resource, where $M \geq 1$, M is an integer, $N \geq 1$, and N is an integer.

It should be noted that, because the SRS does not need to be sent on physical uplink control channels (PUCCH) on two sides of a system bandwidth, the total bandwidth available for the SRS resource is usually less than or equal to the system bandwidth.

In an example, the terminal device may send the SRS on each SRS resource that is between a first moment and a second moment. The first moment is a moment at which the terminal device detects the uplink data or detects the BSR. The second moment is a moment at which the terminal device receives downlink control information (for example, DCI delivered by the network side device for the uplink data, including a downlink resource, HARQ information, and the like that are allocated for the uplink data) that is sent by the network side and that corresponds to the uplink data. To be specific, before receiving scheduling information about scheduling the uplink data by the network side device, the terminal device may send the SRS in each slot in which the SRS resource is configured.

Figure 5:
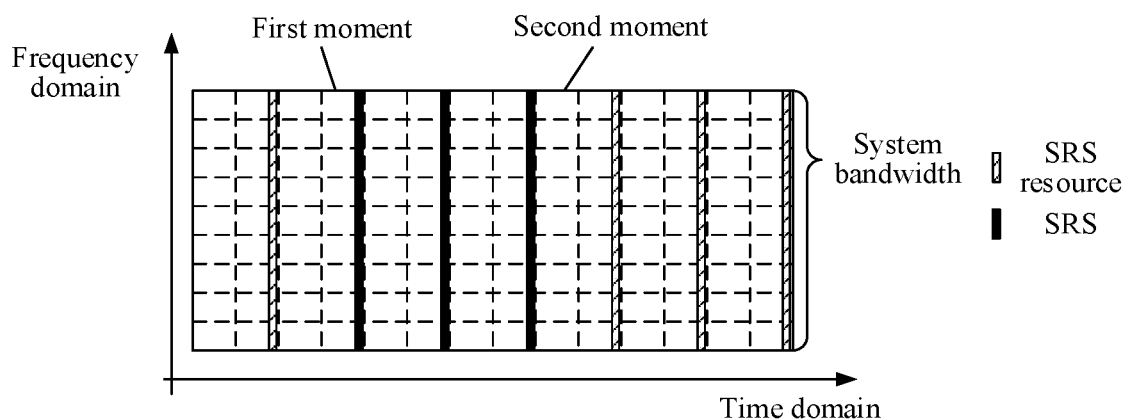
FIG. 5 is a first schematic diagram of sending an SRS on an SRS resource according to the present disclosure.
Figure 6:
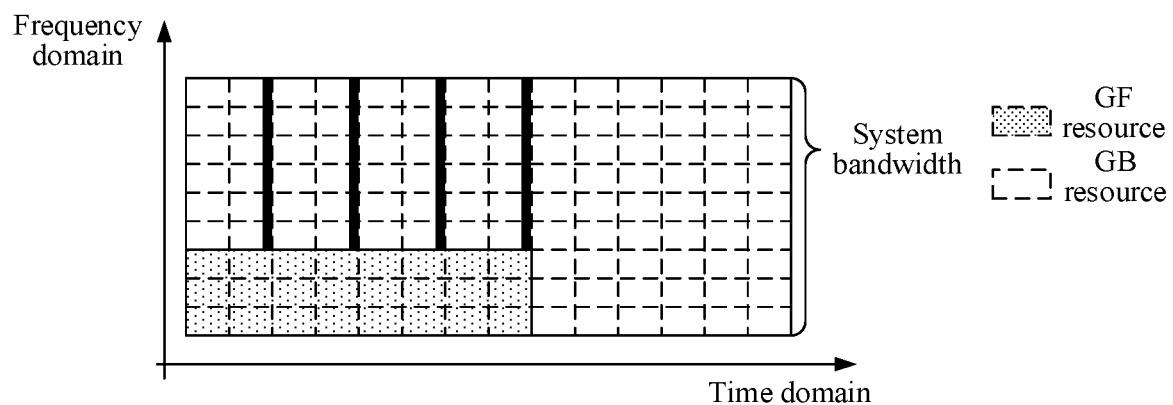
FIG. 6 is a second schematic diagram of sending an SRS on an SRS resource according to the present disclosure.

For example, that the bandwidth of the SRS resource is equal to the total bandwidth available for the SRS resource is used as an example. As shown in FIG. 5, each block with a dashed line represents one resource block (RB). One RB represents 12 subcarriers in frequency domain (which is the vertical axis shown in FIG. 5), and represents one subframe in time domain (which is the horizontal axis shown in FIG. 5). It is assumed that two subframes are a period of the SRS resource (referred to as an SRS period for short below), and the SRS resource is located in the last OFDM symbol of the second subframe in each SRS period. There are three SRS resources between the first moment and the second moment, and the terminal device sends SRSs on each of the three SRS resources.

It should be noted that the RB specification related in the present disclosure is merely an example, and there may be another RB specification. This is not limited in the present disclosure.

In an example, the terminal device may also send the SRS on K SRS resources that are after the first moment, $K \geq 1$, and K is an integer.

With reference to the following three possible scenarios, the following describes an example in which the terminal device sends the SRS on the K SRS resources that are after the first moment.

Scenario 1: It is assumed that the network side device preconfigures a grant-free (GF) resource, so that when the terminal device has the uplink data needing to be transmitted, the terminal device can directly transmit the uplink data on the GF resource without waiting for the network side device to deliver scheduling information for the uplink data (that is, to perform GF data transmission). If a period of the GF resource (a time domain length of a GF resource) is greater than or equal to the SRS resources period (a time domain interval length of two adjacent time domain resources), the terminal device may send the SRS on K SRS resources that are during a period of transmitting the uplink data by using the GF resource. In other words, the terminal device may send the SRS on K SRS resources that are during the GF data transmission.

It should be noted that the network side device may configure the SRS resource and the GF resource by using same higher layer signaling, or may configure the SRS resource and the GF resource by using different higher layer signaling. For example, when the network side device configures the SRS resource and the GF resource by using same higher layer signaling, the SRS configuration information may be a part of a GF resource configuration message.

With reference to the embodiments shown in FIG. 6 to FIG. 17, the following describes an example in which the terminal device sends the SRS on the K resources that are during the period of transmitting the uplink data. In FIG. 6 to FIG. 17, the GF resource includes eight subframes in time domain, and includes 36 subcarriers in frequency domain. That is, a bandwidth of the GF resource is equal to three RB bandwidths. Two subframes are an SRS period, and the SRS resource is located in the last OFDM symbol of the second subframe in each SRS period. There are four SRS resources that are during the period of the GF resource. A total bandwidth available for the SRS resource is nine RB bandwidths. In a GF data transmission process of the terminal device, a bandwidth of the GB resource is equal to the total bandwidth available for the SRS resource minus the bandwidth of the GF resource, that is, equal to six RB bandwidths.

Based on scenario 1, if there are J SRS resources in the period of the GF resource, a value of K may be a quantity of all SRS resources existing in the period of the GF resource, that is, K=J. To be specific, the terminal device may send the SRS on each SRS resource during the period of transmitting the uplink data, thereby enhancing robustness of a system, and improving accuracy of performing uplink channel quality estimation by the network side device.

For example, it is assumed that J=4. If the bandwidth of the SRS resource is equal to the bandwidth of the GB resource, and the SRS resource and the GF resource do not overlap in frequency domain, a schematic diagram of sending the SRS by the terminal device may be shown in FIG. 6.

Figure 7:
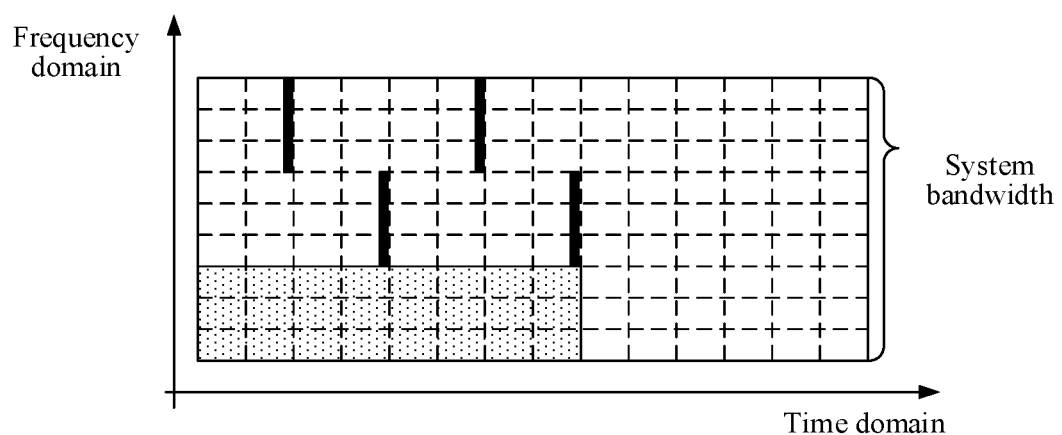
FIG. 7 is a third schematic diagram of sending an SRS on an SRS resource according to the present disclosure.

If the bandwidth of the SRS resource is less than the bandwidth of the GB resource, and the SRS resource and the GF resource do not overlap in frequency domain, as shown in FIG. 7, it is assumed that M=2, that is, a frequency band of each two consecutive SRS resources completely covers a frequency band of the GB resource. The terminal device may send SRSs on four SRS resources shown in FIG. 7 in a frequency hopping manner, so that the four sent SRSs completely cover the frequency band of the GB resource.

Figure 8:
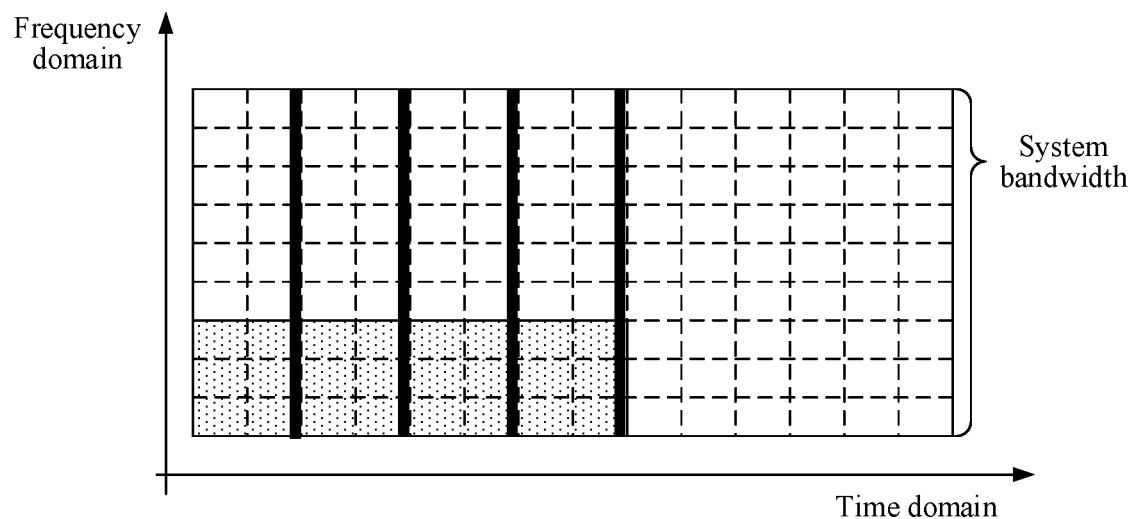
FIG. 8 is a fourth schematic diagram of sending an SRS on an SRS resource according to the present disclosure.

If the bandwidth of the SRS resource is equal to the total bandwidth available for the SRS resource, and the SRS resource and the GF resource have an overlapping part in frequency domain, a schematic diagram of sending an SRS by the terminal device may be shown in FIG. 8.

Figure 9:
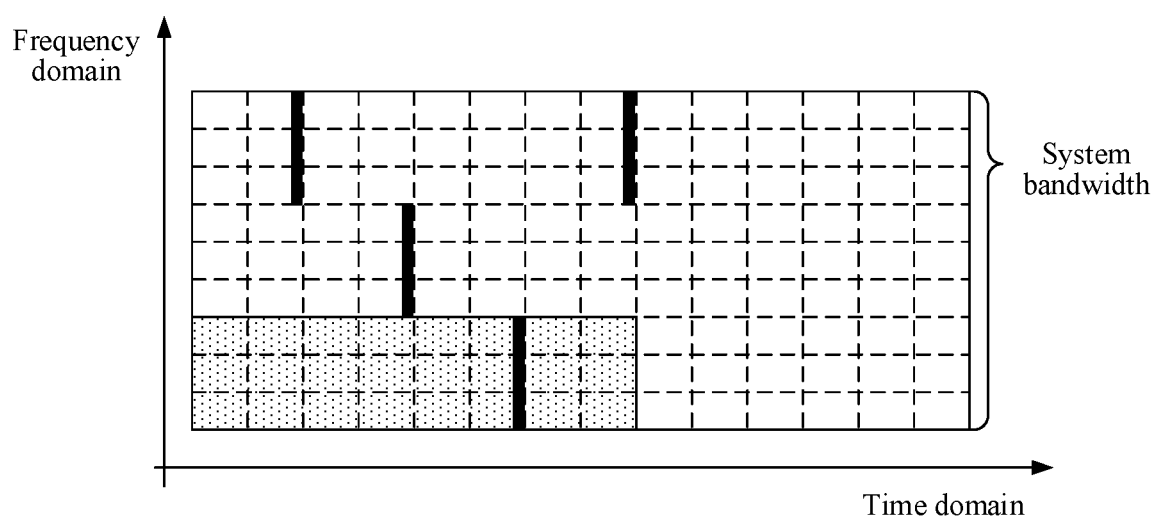
FIG. 9 is a fifth schematic diagram of sending an SRS on an SRS resource according to the present disclosure.

If the bandwidth of the SRS resource is less than the total bandwidth available for the SRS resource, and the SRS resource and the GF resource have an overlapping part in frequency domain, as shown in FIG. 9, it is assumed that N=3, that is, a frequency band of each three consecutive SRS resources completely covers the total bandwidth available for the SRS resource. The terminal device may send SRSs on four SRS resources shown in FIG. 9 in a frequency hopping manner, so that the four sent SRSs completely cover the total bandwidth available for the SRS resource.

It should be noted that, when the SRS resource and the GF resource have an overlapping part in frequency domain, in a period of transmitting the uplink data, the terminal device does not send the uplink data on an OFDM symbol that is used to send the SRS and that is on the GF resource.

In one embodiment, based on scenario 1, when a sum of bandwidths of M SRS resources is equal to the bandwidth of the GB resource, a value of K may be a quantity of SRSs that can completely cover the bandwidth of the GF resource, that is, K=M. The terminal device may send the SRS on any M SRS resources that are during the period of transmitting the uplink data.

Figure 10:
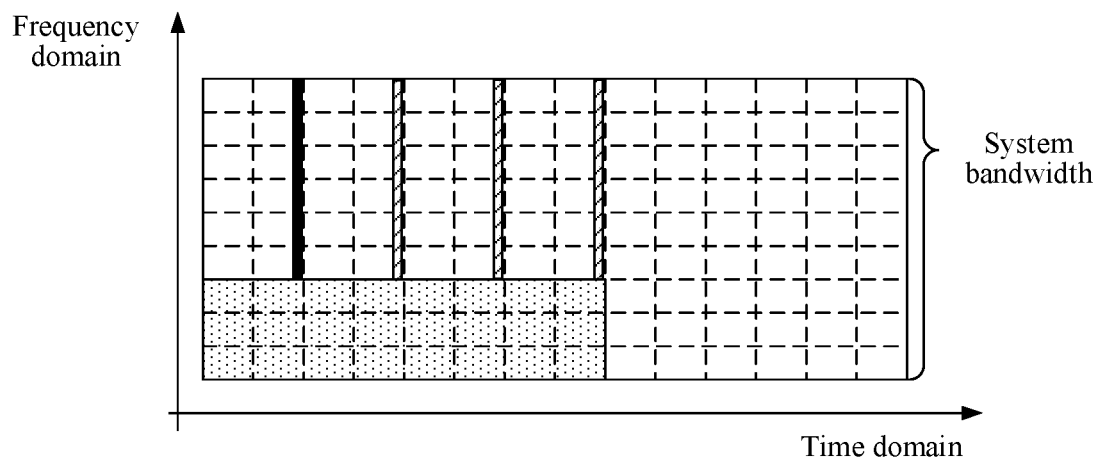
FIG. 10 is a sixth schematic diagram of sending an SRS on an SRS resource according to the present disclosure.
Figure 11:
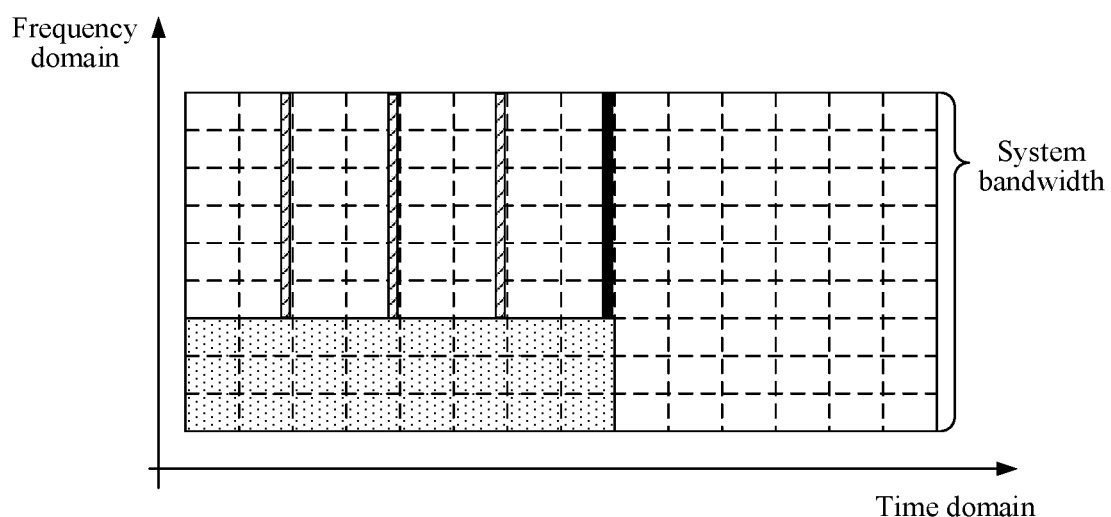
FIG. 11 is a seventh schematic diagram of sending an SRS on an SRS resource according to the present disclosure.

For example, it is assumed that M=1. During the period of transmitting the uplink data, as shown in FIG. 10, the terminal device may send the SRS on the first SRS resource. Alternatively, as shown in FIG. 11, the terminal device may also send the SRS on the last SRS resource.

Figure 12:
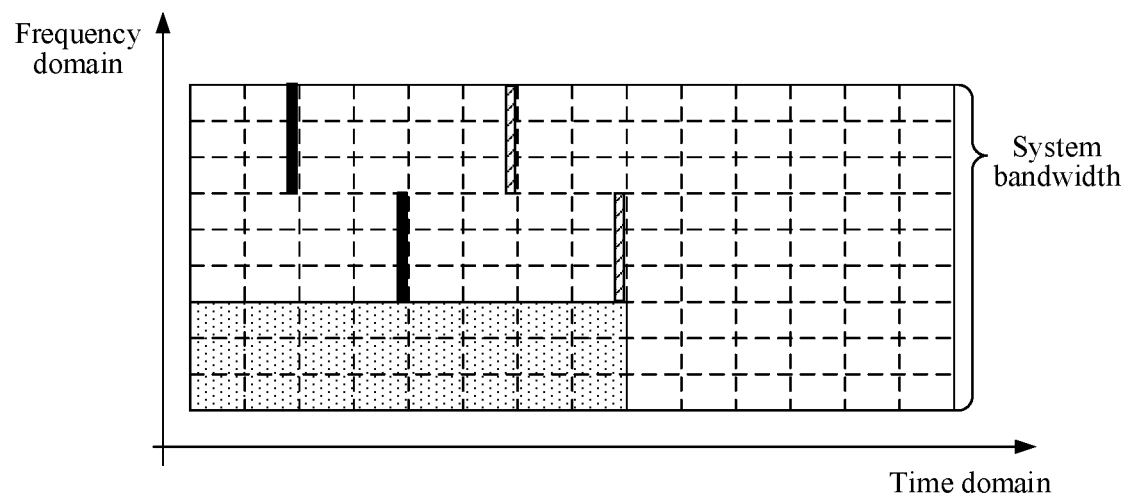
FIG. 12 is an eighth schematic diagram of sending an SRS on an SRS resource according to the present disclosure.
Figure 13:
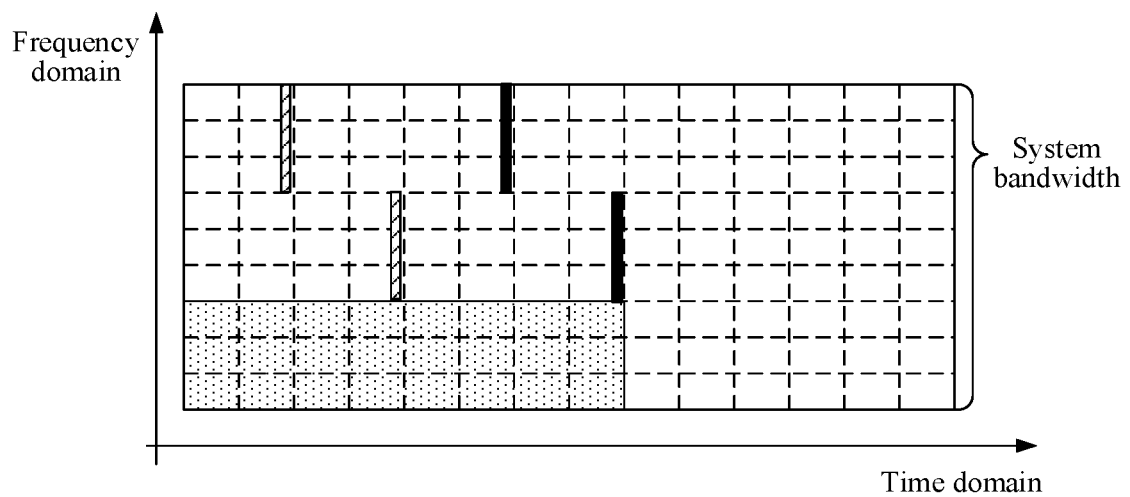
FIG. 13 is a ninth schematic diagram of sending an SRS on an SRS resource according to the present disclosure.

It is assumed that M=2, that is, a frequency band of each two consecutive SRS resources completely covers the frequency band of the GB resource. Therefore, during the period of transmitting the uplink data, as shown in FIG. 12, the terminal device may send SRSs on the first two SRS resources in a frequency hopping manner. Alternatively, as shown in FIG. 13, the terminal device may send SRSs on the last two SRS resources in a frequency hopping manner. So that the two sent SRSs completely cover the frequency band of the GB resource during GF data transmission.

In one embodiment, based on scenario 1, when a sum of bandwidths of N SRS resources is equal to the total bandwidth available for the SRS resource, a value of K may be a quantity of SRSs that can completely cover the total bandwidth available for the SRS resource, that is, K=N. The terminal device may send the SRS on any N SRS resources that are during the period of transmitting the uplink data.

Figure 14:
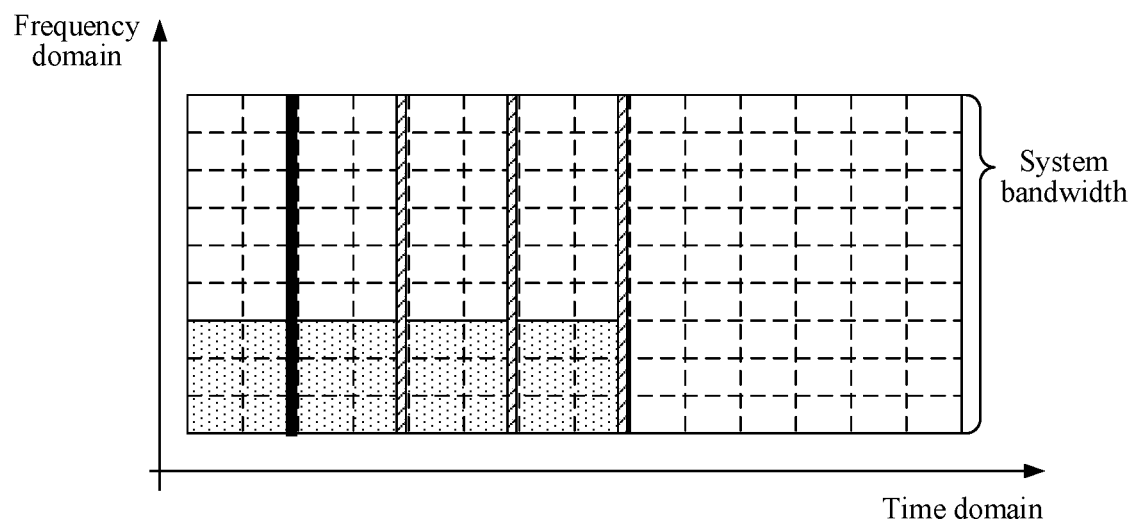
FIG. 14 is a tenth schematic diagram of sending an SRS on an SRS resource according to the present disclosure.
Figure 15:
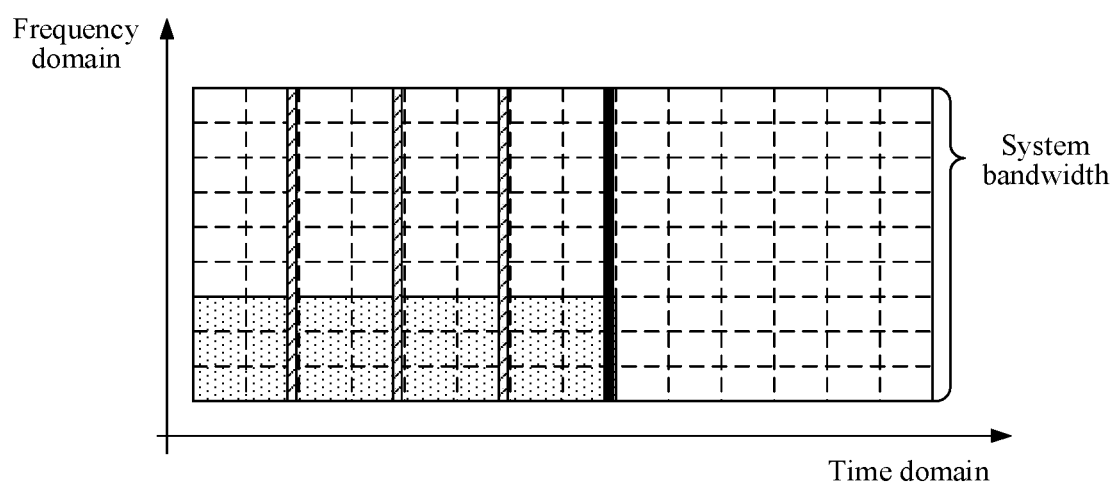
FIG. 15 is an eleventh schematic diagram of sending an SRS on an SRS resource according to the present disclosure.

For example, it is assumed that N=1. During the period of transmitting the uplink data, as shown in FIG. 14, the terminal device may send the SRS on the first SRS resource. Alternatively, as shown in FIG. 15, the terminal device may also send the SRS on the last SRS resource.

Figure 16:
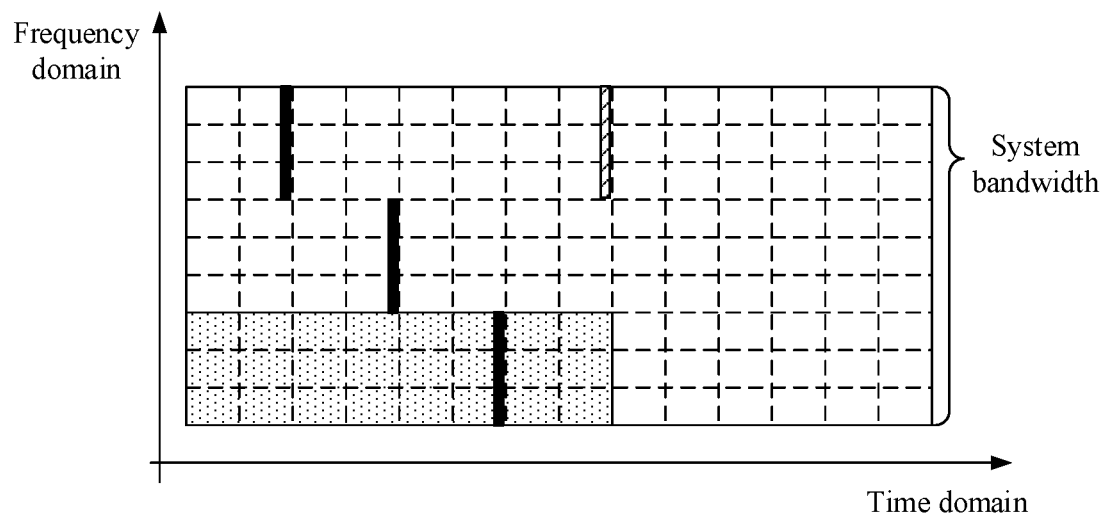
FIG. 16 is a twelfth schematic diagram of sending an SRS on an SRS resource according to the present disclosure.
Figure 17:
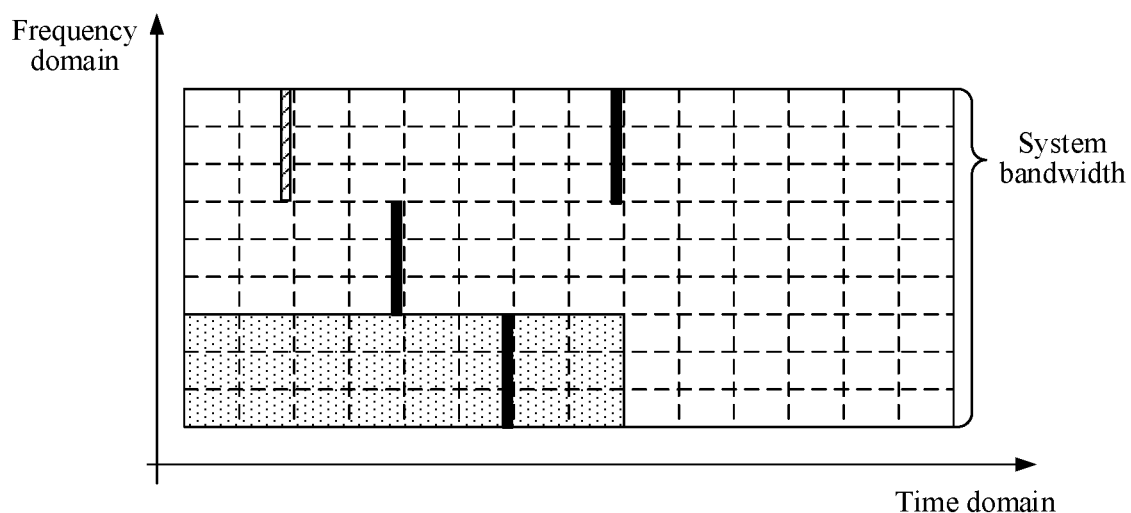
FIG. 17 is a thirteenth schematic diagram of sending an SRS on an SRS resource according to the present disclosure.

It is assumed that N=3, that is, a frequency band of each three consecutive SRS resources completely covers the total bandwidth available for the SRS resource. Therefore, during the period of transmitting the uplink data, as shown in FIG. 16, the terminal device may send SRSs on the first three SRS resources in a frequency hopping manner. Alternatively, as shown in FIG. 17, the terminal device may send SRSs on the last three SRS resources in a frequency hopping manner. So that the sent three SRSs completely cover the total bandwidth available for the SRS resource.

It should be noted that, in scenario 1, when the terminal device has the uplink data needing to be transmitted, the terminal device can transmit the uplink data on a preconfigured GF resource. At the same time, in a period of the GF resource and on the total bandwidth available for the SRS resource or the frequency band of the GB resource, the terminal device sends the SRS for one or more times based on an SRS resource configured by the network side device. Therefore, the network side device may estimate uplink channel quality based on these SRSs, so that when the network side device switches the GF data transmission to GB data transmission, the network side device can deliver scheduling information that is more suitable for the estimated uplink channel quality.

Scenario 2: If a period of the GF resource is less than the SRS period, a sum of bandwidths of N SRS resources is equal to a total bandwidth available for the SRS resource, and a value of K is a quantity of SRSs that can completely cover the total bandwidth available for the SRS resource, that is, K=N, the terminal device may send the SRS on the first K SRS resources that are after the first moment.

Figure 18:
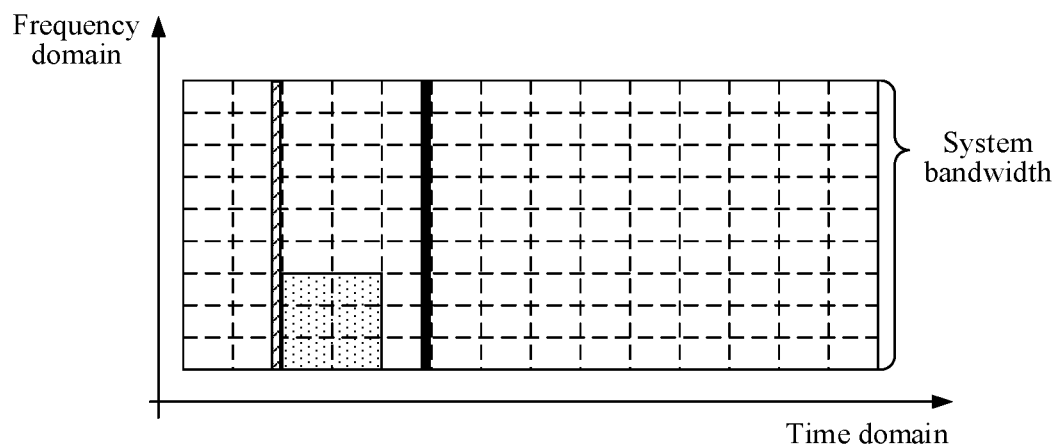
FIG. 18 is a fourteenth schematic diagram of sending an SRS on an SRS resource according to the present disclosure.
Figure 19:
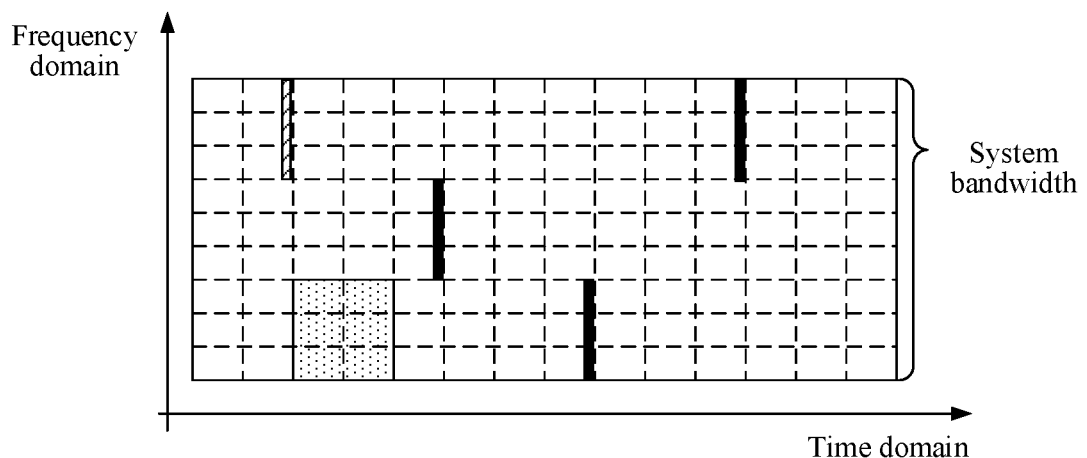
FIG. 19 is a fifteenth schematic diagram of sending an SRS on an SRS resource according to the present disclosure.

For example, as shown in FIG. 18 and FIG. 19, the GF resource includes two subframes in time domain, and includes 36 subcarriers in frequency domain. To be specific, a bandwidth of the GF resource is equal to three RB bandwidths. Three subframes are an SRS period, and the SRS resource is located in the last OFDM symbol of the third subframe in each SRS period. The total bandwidth available for the SRS resource is equal to nine RB bandwidths.

It is assumed that N=1. As shown in FIG. 18, the terminal device may send the SRS on the first SRS resource that is after the first moment.

It is assumed that N=3. As shown in FIG. 19, a frequency band of each three consecutive SRS resources completely covers the total bandwidth available for the SRS resource, and the terminal device may send, in a frequency hopping manner, the SRS on the first three SRS resources that are after the first moment, so that the three SRSs completely cover the total bandwidth available for the SRS resource.

Scenario 3: The terminal device performs conventional GB data transmission. That is, the network side device does not preconfigure the GF resource, and the terminal device needs to transmit the uplink data on the GB resource. A sum of bandwidths of N SRS resources is equal to a total bandwidth available for the SRS resource, and a value of K is a quantity of SRSs that can completely cover the total bandwidth available for the SRS resource, that is, K=N. Therefore, the terminal device may send the SRS on the first K SRS resources that are after the first moment.

Figure 20:
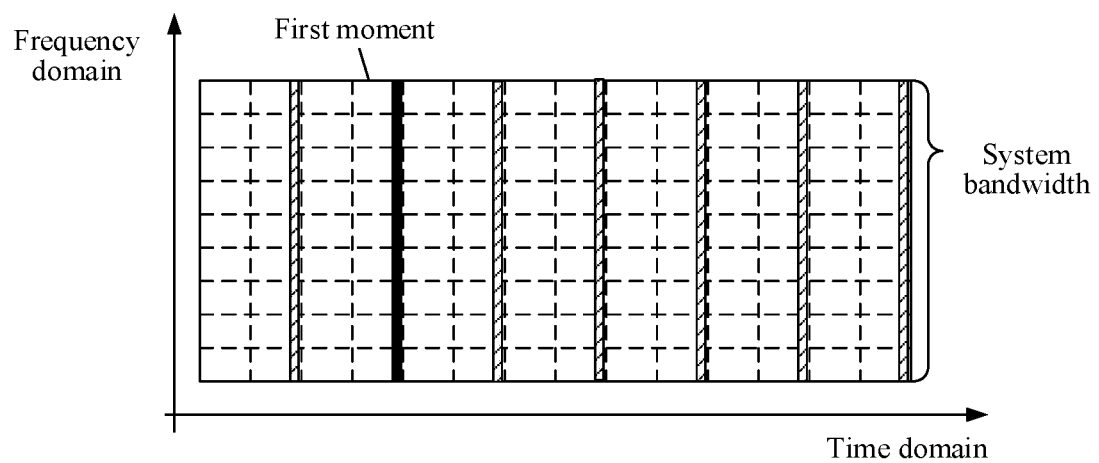
FIG. 20 is a sixteenth schematic diagram of sending an SRS on an SRS resource according to the present disclosure.

It is assumed that N=1. As shown in FIG. 20, the terminal device may send the SRS on the first SRS resource that is after the first moment.

Figure 21:
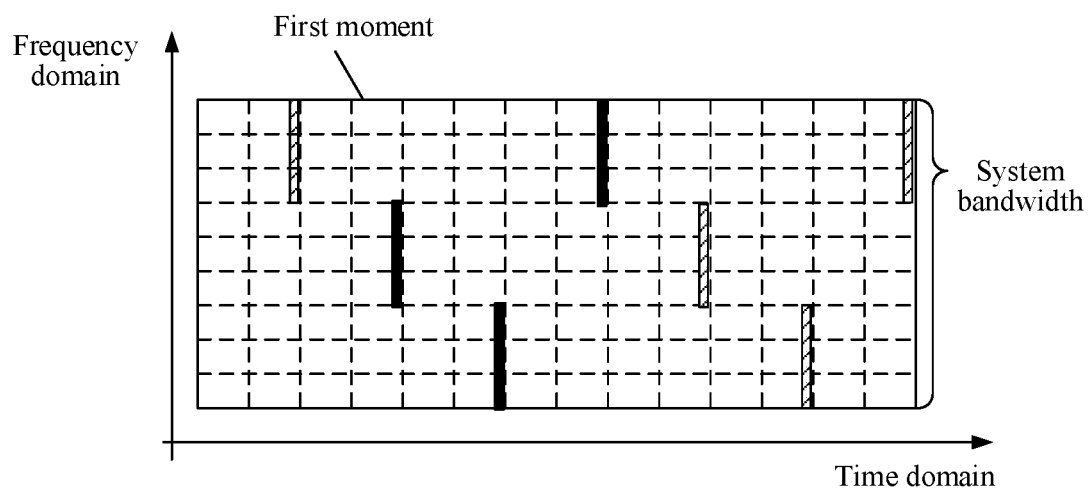
FIG. 21 is a seventeenth schematic diagram of sending an SRS on an SRS resource according to the present disclosure.

It is assumed that N=3. As shown in FIG. 21, a frequency band of each three consecutive SRS resources completely covers the total bandwidth available for the SRS resource, and the terminal device may send, in a frequency hopping manner, the SRS on the first three SRS resources that are after the first moment, so that the three SRSs completely cover the total bandwidth available for the SRS resource.

It should be noted that, in a conventional GB data transmission scenario, when the terminal device has the uplink data needing to be transmitted, the terminal device may independently trigger sending of the SRS, and send the SRS on the first K SRS resources that are after the first moment. In this example, the sent SRS may be used by the network side device to estimate uplink channel quality, or may be used to request, in place of a scheduling request (SR), resource scheduling from the network side device (that is, after receiving the SRS, the network side device may learn of that the terminal device has the uplink data needing to be sent).

In the SRS sending manners in the foregoing listed three possible scenarios, the K SRS resources ensure that there is an SRS being sent on the total bandwidth available for the SRS resource. In addition, in the foregoing three possible scenarios, another SRS sending manner may be further used. For example, after the first moment, an SRS may be sent in a combination mode of any bandwidth size of the SRS resource and any K value. For example, in any one of the foregoing scenarios, it is assumed that a bandwidth of the SRS resource is half of the total bandwidth available for the SRS resource, the terminal device may alternatively send the SRS on the first SRS resource that is after the first moment, that is, send one SRS. There are other available SRS sending manners, which are not listed one by one herein.

Figure 22:
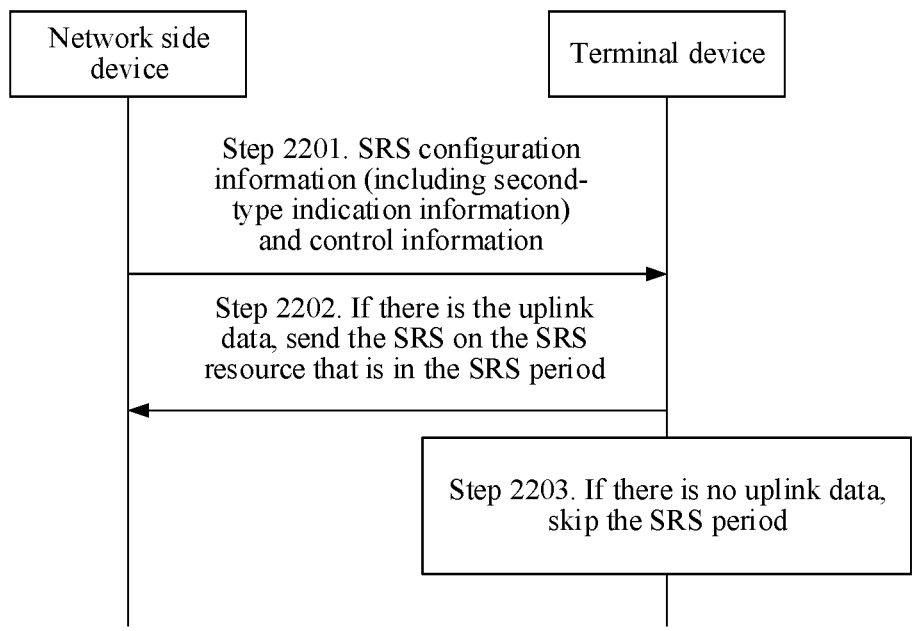
FIG. 22 is a flowchart of an embodiment of another SRS sending method according to the present disclosure.

In an example, FIG. 22 is a flowchart of another embodiment of an SRS sending method according to the present disclosure.

Operation 2201. A network side device sends SRS configuration information and control information to a terminal device. The SRS configuration information includes second-type indication information used to instruct the terminal device to trigger, based on higher layer signaling, sending of an SRS. The control information is used to instruct the terminal device to determine, in each SRS resource period based on whether there is uplink data, whether to skip the SRS resource period.

In this embodiment, in addition to the second-type indication information, the SRS configuration information may further include configuration information of the SRS resource.

In the present disclosure, the network side device may configure the SRS configuration information and the control information in the higher layer signaling. The control information may be a control field, and when the control field is "true", the control information may instruct the terminal device to determine, in each SRS resource period based on whether there is the uplink data in an uplink buffer of the terminal device, whether to skip the SRS resource period.

A trigger type indicator bit in the SRS configuration information is set to trigger type=0 to indicate the second-type indication information. By using the second-type indication information, the terminal device is instructed to send the SRS in a higher layer signaling triggering manner.

It may be understood that, the network side device sends the higher layer signaling that configures the SRS configuration information and the control information, to send the SRS configuration information and the control information to the terminal device.

Operation 2202. If there is the uplink data, the terminal device sends the SRS on an SRS resource that is in the SRS resource period.

Operation 2203. If there is no uplink data, the terminal device skips the SRS resource period.

In this example, after receiving the SRS configuration information, the terminal device may send, based on the second-type indication information, the SRS in the higher layer signaling triggering manner. To be specific, after receiving the higher layer signaling, the terminal device may start to periodically send the SRS on the SRS resource. In addition, when periodically sending the SRS, the terminal device determines, in each SRS resource period based on an indication of the control information, whether there is the uplink data in the uplink buffer of the terminal device. Once there is the uplink data, the terminal device sends the SRS on the SRS resource that is in the SRS resource period; if there is no uplink data, the terminal device skips the SRS resource period. In the present disclosure, the skipping the SRS resource period means skipping sending the SRS on the SRS resource that is in the period.

In the present disclosure, an SRS sending manner of determining, based on whether the uplink data needs to be transmitted in the SRS resource period, whether to skip the SRS resource period may be essentially considered as an SRS sending manner of triggering sending of the SRS based on the uplink data.

Figure 23:
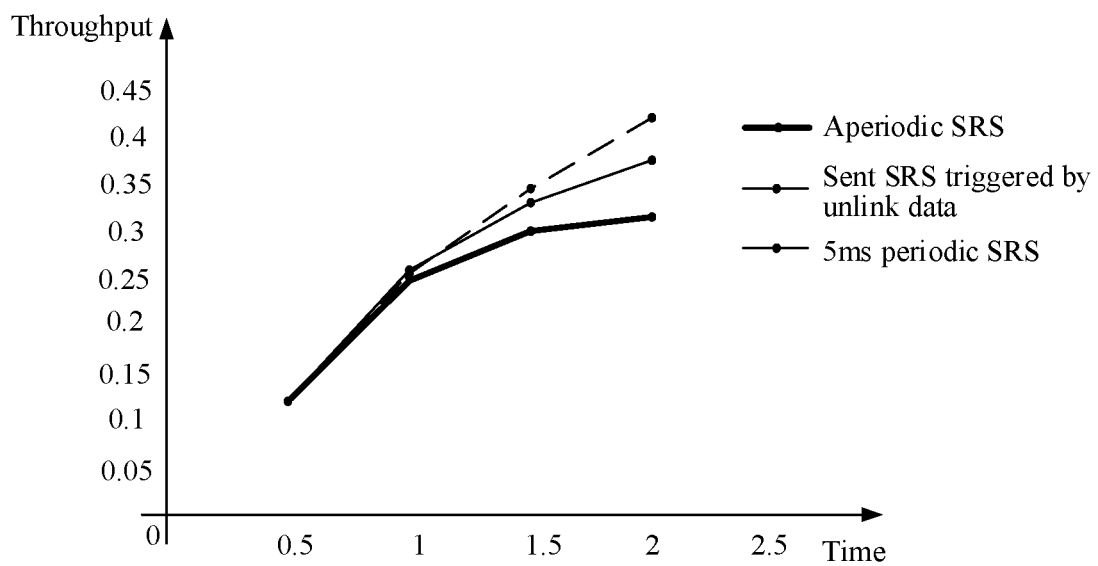
FIG. 23 is a schematic diagram of a throughput comparison result according to the present disclosure.
Figure 24:
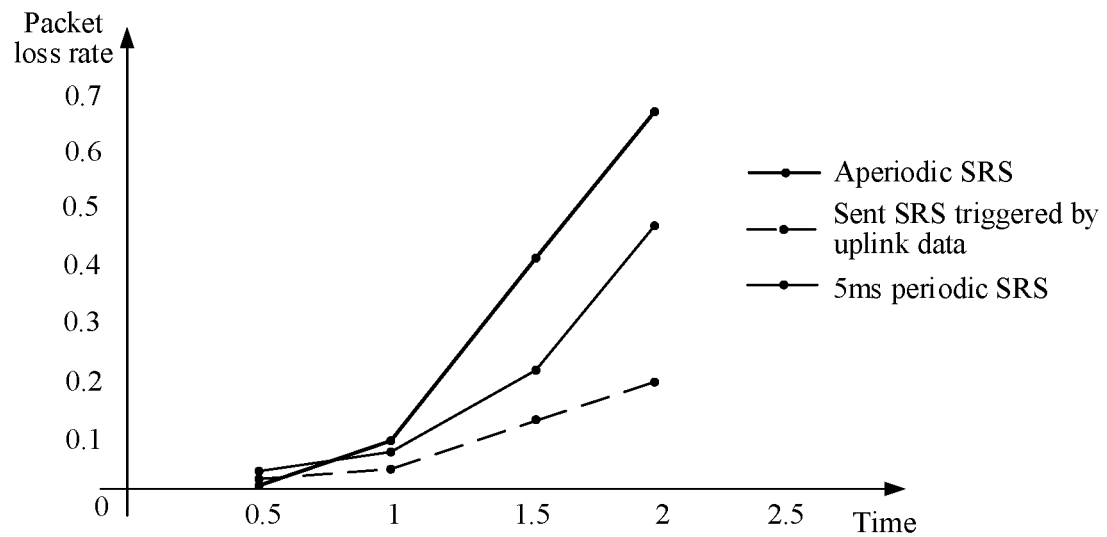
FIG. 24 is a schematic diagram of packet loss rate comparison according to the present disclosure.
Figure 25:
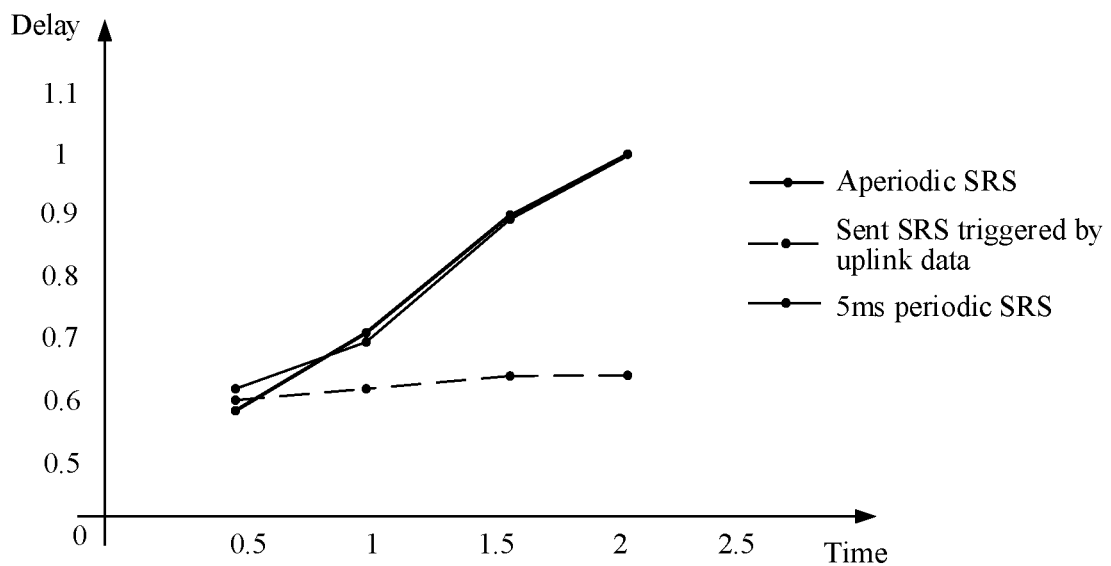
FIG. 25 is a schematic diagram of delay comparison according to the present disclosure.

The following compares gains obtained after performing emulation on the SRS sending method provided in the present disclosure, that is, the sending method of triggering sending of an SRS by uplink data, with gains obtained after performing emulation on a periodic SRS sending method (where a 5 ms periodic SRS is used as an example) and an aperiodic SRS sending method in conventional LTE. FIG. 23 is a schematic diagram of a throughput comparison result. FIG. 24 is a schematic diagram of packet loss rate comparison. FIG. 25 is a schematic diagram of delay comparison.

It can be learned from FIG. 23 to FIG. 25 that, by using the sending method of triggering sending of an SRS based on uplink data provided in the present disclosure, a data packet arrival rate increases, and frequency of sending the SRS by a terminal device also increases correspondingly. Therefore, compared with using the 5 ms periodic SRS and an aperiodic SRS, by using the sending method of triggering sending of an SRS based on uplink data provided in the present disclosure, the network side device can obtain more accurate uplink channel quality, to schedule a more suitable resource for the terminal device, thereby improving spectral efficiency. Therefore, performance (including but not limited to the foregoing throughput, packet loss rate, and delay) of the system is correspondingly improved.

It can be learned from the foregoing embodiments that, by using the sending method of triggering sending of an SRS based on uplink data provided in the present disclosure, an SRS is sent only when there is uplink data needing to be transmitted in an uplink buffer of the terminal device. This avoids sending the SRS when the terminal device has no data to be transmitted, thereby improving SRS resource utilization and reducing resource waste.

The solutions provided in the present disclosure are described above mainly from a perspective of interaction between network elements. It can be understood that, to implement the foregoing functions, the network elements, for example, the terminal device and the network side devices, include corresponding hardware structures and/or software modules for performing the functions. A person skilled in the art should easily be aware that, units and algorithms operations in the examples described with reference to the embodiments disclosed in this specification, may be implemented in a form of hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the present disclosure, functional modules of the network side device, the terminal side device, and the like may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the present disclosure, module division is an example, and is merely logical function division. In actual implementation, another division manner may be used.

Figure 26A:
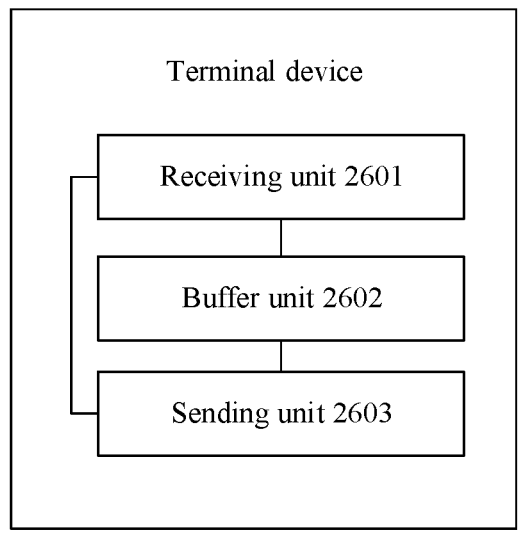
FIG. 26A is a second schematic structural diagram of a terminal device according to the present disclosure.

When each function module is obtained through division corresponding to each function, FIG. 26A is a possible schematic structural diagram of the terminal device in the foregoing embodiments. The terminal device includes: a receiving unit 2601, a buffer unit 2602, and a sending unit 2603. The receiving unit 2601 is configured to support the terminal device in performing operation 401 in FIG. 4 and/or operation 2201 in FIG. 22; the buffer unit 2602 is configured to buffer uplink data; and the sending unit 2603 is configured to support the terminal device in performing operation 402 in FIG. 4 and/or operations 2202 and 2203 in FIG. 22. All related content of the operations in the foregoing method embodiments may be cited in function descriptions of a corresponding function module, and details are not described herein again.

Figure 26B:
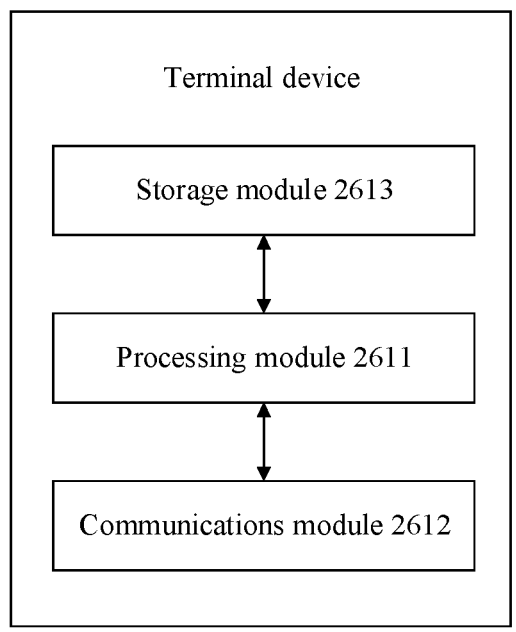
FIG. 26B is a third schematic structural diagram of a terminal device according to the present disclosure.

When an integrated unit is used, FIG. 26B is a possible schematic structural diagram of the terminal device in the foregoing embodiments. The terminal device includes a processing module 2611 and a communications module 2612. The processing module 2611 is configured to control and manage an action of the terminal device. For example, the processing module 2611 is configured to support the terminal device in performing operations 401 and 402 in FIG. 4, operations 2201 to 2203 in FIG. 22, and/or another process used for the technology described in this specification. The communications module 2612 is configured to support the terminal device in communicating with another network entity, for example, communicating with a function module or a network entity shown in FIG. 1. The terminal device may further include a storage module 2613, configured to store program code and data of the terminal device.

The processing module 2611 may be a processor or a controller, for example, may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing module may implement or execute various example logical blocks, modules, and circuits described with reference to content disclosed in the present disclosure. The processor may further be a combination implementing a computing function, for example, a combination of one or more microprocessors, or a combination of the DSP and a microprocessor. The communications module 2612 may be a transceiver, a transceiver circuit, a communications interface, or the like. The storage module 2613 may be a memory.

Figure 26C:
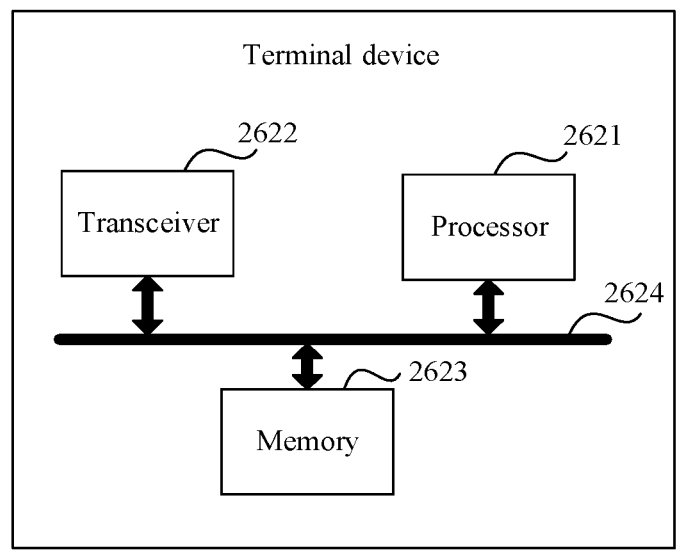
FIG. 26C is a fourth schematic structural diagram of a terminal device according to the present disclosure.

When the processing module 2611 is a processor, the communications module 2612 is a transceiver, and the storage module 2613 is a memory, the terminal device in the present disclosure may be the terminal device shown in FIG. 26C.

Referring to FIG. 26C, the terminal device includes a processor 2621, a transceiver 2622, a memory 2623, and a bus 2624. The transceiver 2622, the processor 2621, and the memory 2623 are connected to each other by using the bus 2624. The bus 2624 may be a peripheral component interconnect (PCI) standard bus, an extended industry standard architecture (EISA) bus, or the like. The bus may be classified into an address bus, a data bus, a control bus, and the like. For ease of representation, only one thick line is used to represent the bus in FIG. 26C, but this does not mean that there is only one bus or only one type of bus.

Figure 27A:
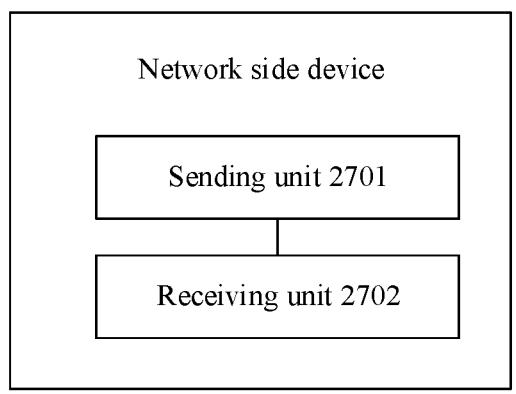
FIG. 27A is a second schematic structural diagram of a network side device according to the present disclosure.

When each function module is obtained through division corresponding to each function, FIG. 27A is a possible schematic structural diagram of the network side device in the foregoing embodiments. The network side device includes: a sending unit 2701 and a receiving unit 2702. The sending unit 2701 is configured to support the network side device in performing operation 401 in FIG. 4 and/or operation 2201 in FIG. 22; the receiving unit 2702 is configured to support the network side device in performing operation 402 in FIG. 4 and/or operations 2202 and 2203 in FIG. 22. All related content of the operations in the foregoing method embodiments may be cited in function descriptions of a corresponding function module, and details are not described herein again.

Figure 27B:
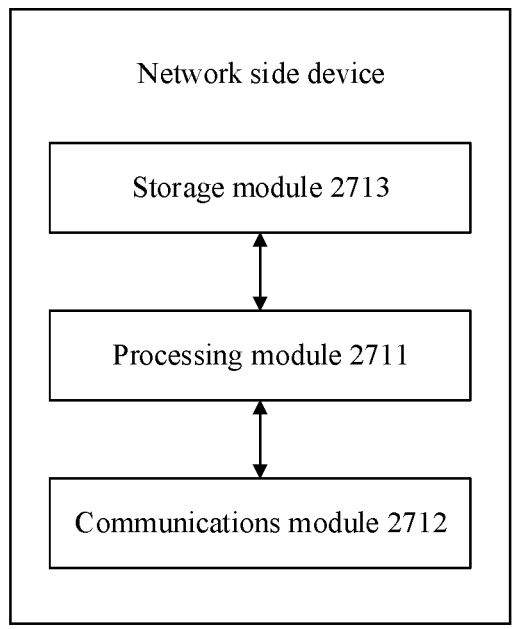
FIG. 27B is a third schematic structural diagram of a network side device according to the present disclosure.

When an integrated unit is used, FIG. 27B is a possible schematic structural diagram of the network side device in the foregoing embodiments. The network side device includes a processing module 2711 and a communications module 2712. The processing module 2711 is configured to control and manage an action of the network side device. For example, the processing module 2711 is configured to support the network side device in performing operations 401 and 402 in FIG. 4, operations 2201 to 2203 in FIG. 22, and/or another process used for the technology described in this specification. The communications module 2712 is configured to support the network side device in communicating with another network entity, for example, communicating with a function module or a network entity shown in FIG. 1. The network side device may further include a storage module 2713, configured to store program code and data of the network side device.

The processing module 2711 may be a processor or a controller, for example, may be a CPU, a general purpose processor, a DSP, an ASIC, an FPGA, or another programmable logic device, a transistor logic device, a hardware component, or any combination thereof. The processing module may implement or execute various example logical blocks, modules, and circuits described with reference to content disclosed in the present disclosure. The processor may further be a combination implementing a computing function, for example, a combination of one or more microprocessors, or a combination of the DSP and a microprocessor. The communications module 2712 may be a transceiver, a transceiver circuit, a communications interface, or the like. The storage module 2713 may be a memory.

Figure 27C:
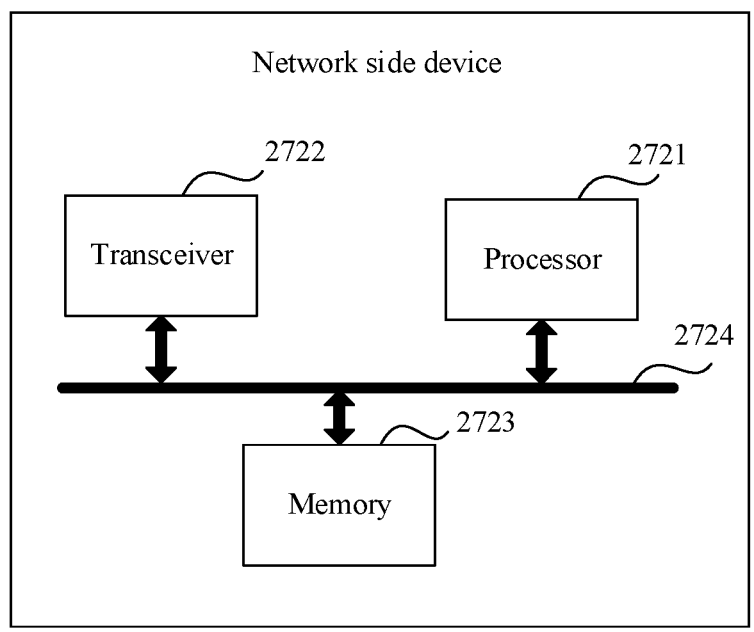
FIG. 27C is a fourth schematic structural diagram of a network side device according to the present disclosure.

When the processing module 2711 is a processor, the communications module 2712 is a transceiver, and the storage module 2713 is a memory, the network side device in the present disclosure may be the network side device shown in FIG. 27C.

Referring to FIG. 27C, the network side device includes a processor 2721, a transceiver 2722, a memory 2723, and a bus 2724. The transceiver 2722, the processor 2721, and the memory 2723 are connected to each other by using the bus 2724. The bus 2724 may be a PCI bus, an EISA bus, or the like. The bus may be classified into an address bus, a data bus, a control bus, and the like. For ease of representation, only one thick line is used to represent the bus in FIG. 27C, but this does not mean that there is only one bus or only one type of bus.

Method or algorithm operations described in combination with the content disclosed in the present disclosure may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (erasable programmable ROM, EPROM), an electrically erasable programmable read-only memory (electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may also be a component of the processor. The processor and the storage medium may be located in the ASIC. In addition, the ASIC may be located in a core network interface device. Certainly, the processor and the storage medium may also exist in the core network interface device as discrete components.

In specific implementation, the present disclosure further provides a computer storage medium, where the computer storage medium may store a program, and when the program is executed, some or all of the operations of the embodiments of the SRS sending method or the SRS receiving method provided in the present disclosure may be included. The storage medium may be a magnetic disk, an optical disc, a read-only storage memory, a random access memory (RAM), or the like.

The present disclosure further provides a computer program product including an instruction, and when the computer program product is run on a computer, the computer is enabled to perform some or all of the operations in the embodiments of the SRS sending method or the SRS receiving method provided in the present disclosure.

A person skilled in the art may clearly understand that, the technologies in the present disclosure may be implemented by software in addition to a suitable general hardware platform. Based on such an understanding, the technical solutions of the present disclosure essentially or the part contributing to the prior art may be implemented in a form of a software product. The computer software product may be stored in a storage medium, such as a ROM/RAM, a magnetic disk, or an optical disc, and includes several instructions for enabling a computer device (which may be a personal computer, a server, or a VPN gateway) to perform the methods described in the embodiments or in some parts of the embodiments of the present disclosure.

For same or similar parts in the embodiments in this specification, refer to each other. Especially, the apparatus embodiment is basically similar to a method embodiment, and therefore is described briefly. For related parts, refer to descriptions in the method embodiment.

The foregoing descriptions are implementations of the present disclosure, but are not intended to limit the protection scope of the present disclosure.

What is claimed is:

1. A sounding reference signal (SRS) sending method, applied to a terminal device, comprising:
   receiving SRS configuration information sent by a network side device, wherein the SRS configuration information comprises first-type indication information used to instruct the terminal device to trigger, based on uplink data, sending of an SRS;
   once there is the uplink data needing to be transmitted, sending the SRS on each SRS resource that is after a first moment and before a second moment, wherein the first moment is a moment at which the uplink data is detected or a buffer status report BSR is detected, and the second moment is a moment at which downlink control information that is sent by the network side device and that corresponds to the uplink data is received; and
   transmitting the uplink data on a grant-free (GF) resource, wherein a period of the GF resource is greater than or equal to a SRS resource period, and J SRS resources exist in the period of the GF resource.

2. The method according to claim 1, wherein the SRS configuration information further comprises configuration information of the SRS resource.

3. The method according to claim 1, wherein the sending the SRS on the SRS resource comprises:
   sending the SRS on each SRS resource that is between a first moment and a second moment, wherein the first moment is a moment at which the uplink data is detected or a buffer status report BSR is detected, and the second moment is a moment at which downlink control information that is sent by the network side device and that corresponds to the uplink data is received.

4. The method according to claim 1, wherein the sending the SRS on the SRS resource comprises:
   sending the SRS on K SRS resources that are after a first moment, wherein the first moment is a moment at which the uplink data is detected or a BSR is detected, $K \geq 1$, and K is an integer.

5. The method according to claim 4, wherein a sum of bandwidths of M SRS resources is equal to a bandwidth of a grant-based (GB) resource, or a sum of bandwidths of N SRS resources is equal to a total bandwidth available for the SRS resource, wherein $M \geq 1$, M is an integer, $N \geq 1$, and N is an integer.

6. The method according to claim 5, wherein the method further comprises:
   the sending the SRS on K SRS resources that are after the first moment comprises:
   sending the SRS on the K SRS resources that are during a period when the uplink data is transmitted, wherein K={M, N, J}.

7. The method according to claim 6, wherein when K={M, N}, the sending the SRS on the K SRS resources that are during a period when the uplink data is transmitted comprises:
   sending the SRS on the last K SRS resources that are during the period when the uplink data is transmitted.

8. The method according to claim 5, wherein the method further comprises:
   transmitting the uplink data on a GF resource, wherein a period of the GF resource is less than a SRS resource period, and
   the sending the SRS on K SRS resources that are after the first moment comprises:
   correspondingly sending the SRS on the first K SRS resources that are after the first moment, wherein K=N.

9. A sounding reference signal (SRS) receiving method, applied to a network side device, comprising:
   sending SRS configuration information to a terminal device, wherein the SRS configuration information comprises first-type indication information used to instruct the terminal device to trigger, based on uplink data, sending of an SRS; and
   receiving the SRS that is sent by the terminal device based on the SRS configuration information on each SRS resource that is after a first moment and before a second moment, wherein the first moment is a moment at which the uplink data is detected or a buffer status report BSR is detected, and the second moment is a moment at which downlink control information that is sent by the network side device and that corresponds to the uplink data is received; and
   transmitting the uplink data on a grant-free (GF) resource, wherein a period of the GF resource is greater than or equal to a SRS resource period, and J SRS resources exist in the period of the GF resource.

10. The method according to claim 9, wherein the SRS configuration information further comprises configuration information of a resource used to send the SRS.

11. A terminal device, comprising:
a receiving unit, configured to receive sounding reference signal (SRS) configuration information sent by a network side device, wherein the SRS configuration information comprises first-type indication information used to instruct a sending unit to trigger, based on uplink data, sending of an SRS;
a buffer unit, configured to buffer the uplink data;
the sending unit, configured to: once there is the uplink data needing to be transmitted in the buffer unit, send the SRS on each SRS resource that is after a first moment and before second moment, wherein the first moment is a moment at which the uplink data is detected or a buffer status report BSR is detected, and the second moment is a moment at which downlink control information that is sent by the network side device and that corresponds to the uplink data is received; and transmitting the uplink data on a grant-free (GF) resource, wherein a period of the GF resource is greater than or equal to a SRS resource period, and J SRS resources exist in the period of the GF resource.

12. The terminal device according to claim 11, wherein the SRS configuration information further comprises configuration information of the SRS resource.

13. The terminal device according to claim 11, wherein the sending, by the sending unit, the SRS on the SRS resource specifically comprises:
sending the SRS on each SRS resource that is between a first moment and a second moment, wherein the first moment is a moment at which the uplink data is detected or a buffer status report BSR is detected, and the second moment is a moment at which downlink control information that is sent by the network side device and that corresponds to the uplink data is received.

14. The terminal device according to claim 11, wherein the sending, by the sending unit, the SRS on the SRS resource specifically comprises:
sending the SRS on K SRS resources that are after a first moment, wherein the first moment is a moment at which the uplink data is detected or a BSR is detected, $K \geq 1$, and K is an integer.

15. The terminal device according to claim 14, wherein a sum of bandwidths of M SRS resources is equal to a bandwidth of a grant-based (GB) resource, or a sum of bandwidths of N SRS resources is equal to a total bandwidth available for the SRS resource, wherein $M \geq 1$, M is an integer, $N \geq 1$, and N is an integer.

16. The terminal device according to claim 15, wherein the sending, by the sending unit, the SRS on K SRS resources that are after the first moment specifically comprises:
sending the SRS on the K SRS resources that are during a period when the uplink data is transmitted, wherein K={M, N, J}.

17. The terminal device according to claim 16, wherein when K={M, N}, the sending, by the sending unit, the SRS on the K SRS resources that are during a period when the uplink data is transmitted specifically comprises:
sending the SRS on the last K SRS resources that are during the period when the uplink data is transmitted.

18. The terminal device according to claim 15, wherein the sending unit is further configured to transmit the uplink data on a GF resource, wherein a period of the GF resource is less than a SRS resource period; and
the sending, by the sending unit, the SRS on K SRS resources that are after the first moment specifically comprises:
sending the SRS on the first K SRS resources that are after the first moment, wherein K=N.

19. A network side device, comprising:
a sending unit, configured to send sounding reference signal (SRS) configuration information to a terminal device, wherein the SRS configuration information comprises first-type indication information used to instruct the terminal device to trigger, based on uplink data, sending of an SRS on each SRS resource that is after a first moment and before a second moment, wherein the first moment is a moment at which the uplink data is detected or a buffer status report BSR is detected, and the second moment is a moment at which downlink control information that is sent by the network side device and that corresponds to the uplink data is received;
a receiving unit, configured to receive the SRS that is sent by the terminal device based on the SRS configuration information and transmitting the uplink data on a grant-free (GF) resource, wherein a period of the GF resource is greater than or equal to a SRS resource period, and J SRS resources exist in the period of the GF resource.

20. The network side device according to claim 19, wherein the SRS configuration information further comprises configuration information of a resource used to send the SRS.

* * * * *